Sept. 2, 1924.  O. H. VAUDELL  1,507,531

TRAP

Filed Jan. 9, 1922

O. H. Vaudell, INVENTOR

BY Victor J. Evans ATTORNEY

WITNESS: Paul W. Hunt

Patented Sept. 2, 1924.

1,507,531

UNITED STATES PATENT OFFICE.

OTTO H. VAUDELL, OF NEW LISBON, WISCONSIN.

TRAP.

Application filed January 9, 1922. Serial No. 528,038.

*To all whom it may concern:*

Be it known that I, OTTO H. VAUDELL, a citizen of the United States, residing at New Lisbon, in the county of Juneau and State of Wisconsin, have invented new and useful Improvements in Traps, of which the following is a specification.

This invention relates to sink traps or the like, designed to prevent foul air, gases or the like from finding its way to the sewer pipe to the room, the trap in its entirety being made up of parts which can be readily and conveniently assembled or disassembled as the occasion may require.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein.

Figure 1:
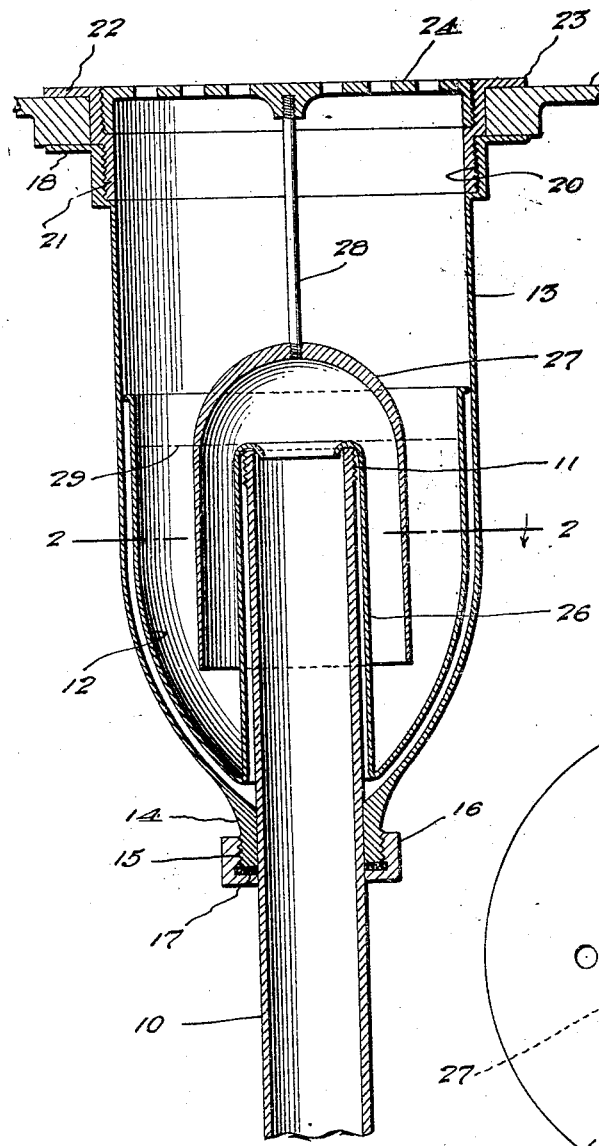
Figure 1 is a vertical sectional view through a trap constructed in accordance with the invention.
Figure 2:
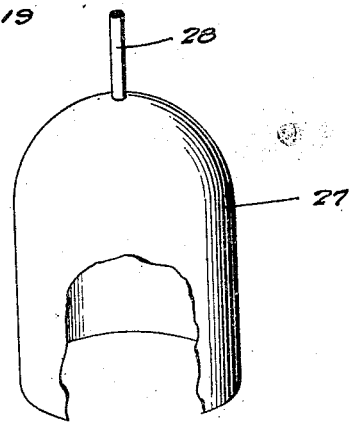
Figure 2 is a similar view of the dome.
Figure 3:
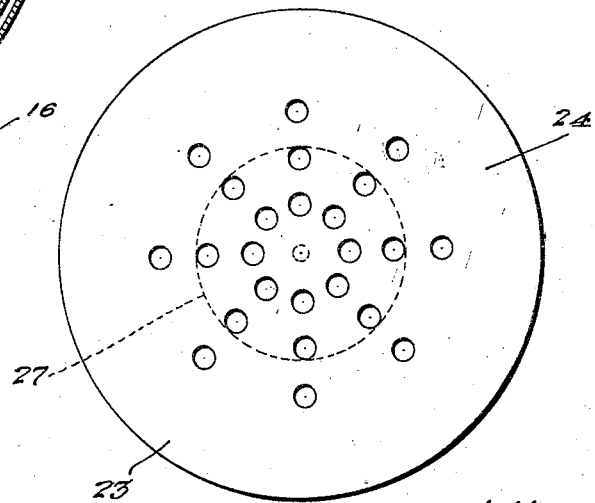
Figure 3 is a detail view of the trap.

Referring to the drawings in detail, 10 indicates the sewer pipe which is threaded at its upper end as at 11 for a purpose to be hereinafter described. The trap which is associated with the sewer pipe embodies an inner casing 12 and an outer casing 13, the latter being reduced at one end to snugly embrace the waste pipe 10 at an appropriate point or distance below the upper end thereof. This reduced extremity 14 of the outer casing is threaded as at 15 to accommodate a nut 16. The nut is designed to impinge therebetween and the lower end of the outer casing, a gasket 17 to provide a leak proof joint between the trap and the waste pipe 10.

The outer casing 13 terminates to provide an annular flange 18 which bears against one side of the sink or other article with which the trap may be used, which portion of the article being indicated at 19. The outer casing is also interiorly threaded as at 20 to accommodate the threads 21 of the cap 22 which is of annular formation and open at both ends. This cap also terminates to provide a flange 23 arranged in parallelism with the flange 18 and adapted to repose upon the portion 19 of the article with which the trap is used. A perforated cover in the nature of a disk or the like is indicated at 24.

The inner casing 12 is substantially of the same configuration as the outer casing 13, except that the inner casing is formed with a central tubular portion 26 which overhangs the upper end of the waste pipe 10 upon which it is supported. The inner casing is primarily intended to receive and collect refuse and other foreign matter that passes into the outer casing through the perforations of the cover 24, and inasmuch as this inner casing is merely supported upon the upper end of the pipe 10, it can be conveniently removed and cleaned as the occasion requires without disturbing the outer casing which is adapted to remain associated with the pipe 10. The upper end of the waste pipe 10 is closed by a dome 27 which also surrounds the tubular portion 26 of the inner casing, while projecting inwardly from the dome at spaced points, are suitable supporting elements 28 which repose upon the upper edge of the waste pipe to support the dome in proper position. In order for the water to gain access to the waste pipe 10, it must pass beneath the lower end of the dome 27, thence upwardly into the pipe 10. This manifestly, leaves the inner casing substantially full of water, the water level being indicated by dotted lines at 29, thereby sealing the upper end of the waste pipe so as to prevent obnoxious gases passing from the pipe 10 into the room. The construction of the trap is such, that the parts can be very easily assembled or disassembled, as the occasion may require. For instance, when it is desired to flush the sewer pipe 10, it is only necessary to remove the cover 24 together with the casing or rim 22, after which the dome and inner casing 12 can be easily removed from within the outer casing 13. A hose can then be attached to the threaded portion 11 of the sewer pipe 10, and also attached to the faucet or other suitable source of water supply.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A trap for a sewer pipe comprising an outer casing having an opening in the bottom thereof to receive the pipe, means for connecting the casing with the pipe with the latter terminating an appreciable distance below the upper edge of said casing, an inner casing arranged within the outer casing and slightly spaced therefrom, the inner casing having an opening in the bottom thereof and formed with a central tubular portion which receives the pipe, an inwardly and downwardly extended flange formed on the upper end of the tubular portion and utilized and extended into the upper end of the pipe to support the casing, the tubular portion being of a larger diameter than the pipe and spaced therefrom, a cover for the outer casing, a rod depending from the cover, and a dome shaped member supported by the rod and surrounding the adjacent end of said pipe and tubular portion of the inner casing.

In testimony whereof I affix my signature.

OTTO H. VAUDELL.